United States Patent
Fitzgerald

(10) Patent No.: US 6,776,459 B2
(45) Date of Patent: Aug. 17, 2004

(54) AERO-SPINNER

(76) Inventor: Richard Henry Fitzgerald, 5553 W. Leitner Dr., Coral Springs, FL (US) 33067

( * ) Notice: Subject to any disclaimer, the term of this patent is extended or adjusted under 35 U.S.C. 154(b) by 88 days.

(21) Appl. No.: 10/184,741

(22) Filed: Jun. 28, 2002

(65) Prior Publication Data

US 2004/0000812 A1 Jan. 1, 2004

(51) Int. Cl.[7] .................................................. B60B 7/20
(52) U.S. Cl. .............................. 301/37.25; 301/37.371; 301/108.4
(58) Field of Search ........................ 301/37.25, 37.101, 301/37.102, 37.21, 37.26, 37.38, 37.371, 108.1, 108.4, 108.5, 37.108, 37.109

(56) References Cited

U.S. PATENT DOCUMENTS

| | | | | |
|---|---|---|---|---|
| 2,762,469 A | * | 9/1956 | Lyon | 188/264 W |
| D191,394 S | * | 9/1961 | Garcia | D12/204 |
| 3,158,946 A | * | 12/1964 | Upchurch | 301/37.101 |
| 3,219,391 A | * | 11/1965 | Hettinger | 301/37.25 |
| 3,722,958 A | * | 3/1973 | Marshall | 301/37.25 |
| 5,290,094 A | * | 3/1994 | Gragg | 301/37.25 |
| 5,588,715 A | * | 12/1996 | Harlen | 301/37.25 |
| D379,080 S | * | 5/1997 | Choi | D12/213 |
| D379,959 S | * | 6/1997 | Miansian | D12/213 |
| D380,185 S | * | 6/1997 | Miansian | D12/213 |
| D385,247 S | * | 10/1997 | Miansian | D12/213 |
| D396,683 S | * | 8/1998 | Miansian | D12/213 |
| D397,665 S | * | 9/1998 | Noriega | D12/213 |

* cited by examiner

Primary Examiner—Russell D. Stormer

(57) ABSTRACT

The present invention relates to an accessory that is attached to vehicles and it rotates on its axis as the force of the wind drives it. The rotation of the accessory is independent of the rotation of the wheel. It contains two or more air driven surfaces. The ratio of the drag coefficients of the leading surface to the trailing surface is equal to or greater than 1.01. The accessory spins either clockwise or counter clockwise as the vehicle picks up speed creating an extremely attractive view.

5 Claims, 7 Drawing Sheets

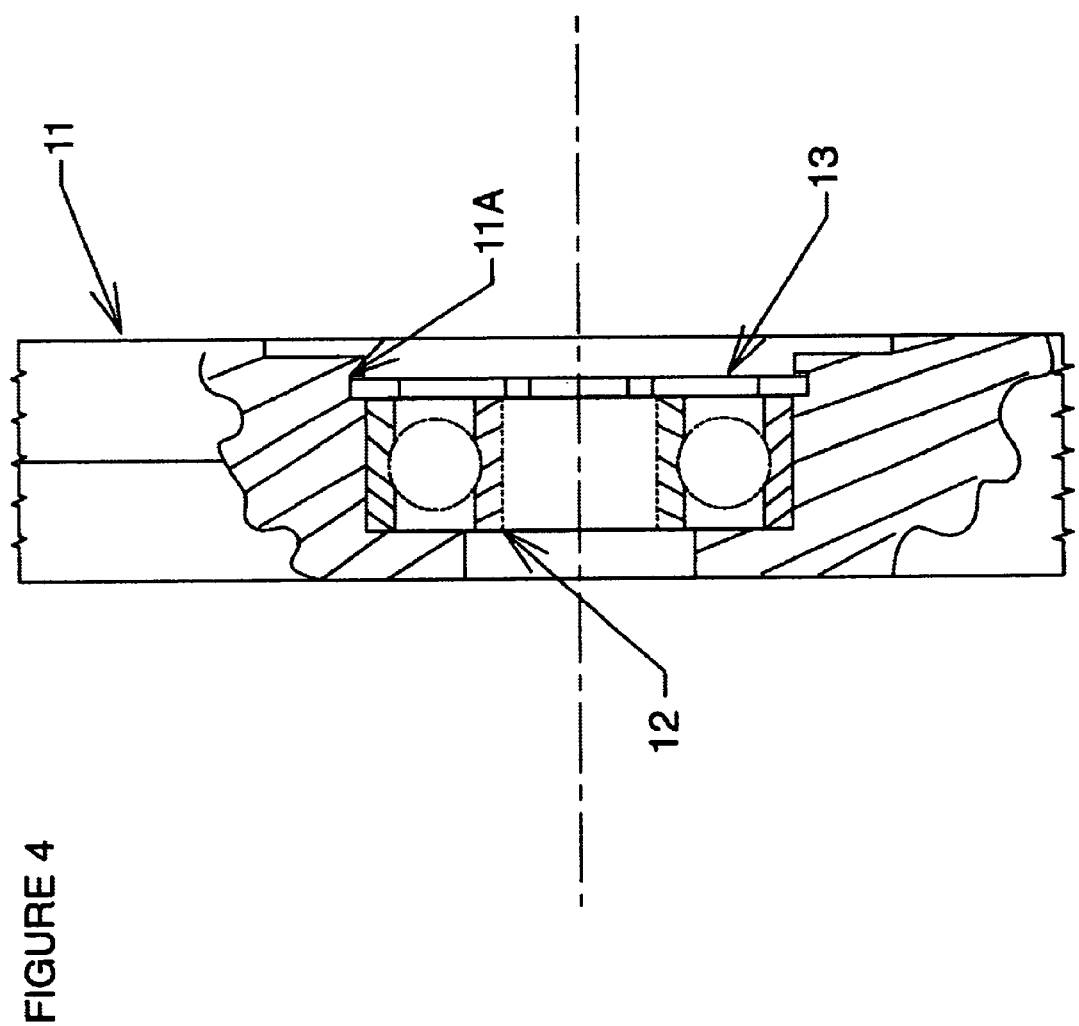

AERO-SPINNER

BACKGROUND OF THE INVENTION

1. Field of the Invention

The present invention relates to an air driven accessory that rotates exclusively as a function of the air velocity surrounding the accessory that is attached to a motorcycle non-rotating axles. The rotating device and the cap end cone can be chrome-plated, anodized or painted and can be made using selected materials from the group of metals, alloys and plastics.

2. Description of the Prior Art

U.S. Pat. No. 5,290,094 discloses a revolving decorative wheel cover that is attached to a rotating wheel of an automobile. Through the use of a bearing, a wing like accessory is attached allowing the wings like portion of the attachment to rotate independently of the rotation of the wheel.

U.S. Pat. No. 3,219,391 discloses a revolving wheel disk cover attached to a rotating vehicle wheel. The disk cover is attachable to and removable from a rotating vehicle wheel in the same manner as a hubcap. As the vehicle moves, the resulting air flowing past the vehicle causes the disk cover to revolve independently of the wheel itself U.S. Pat. No. 3,158,946 discloses a hubcap, which is attached to a rotating vehicle wheel, which includes a rotatable outer wire assembly. The outer wire assembly is adapted to continue to spin after the vehicle comes to a stop.

U.S. Pat. No. 5,588,715 discloses a stationary non-rotating wheel cover that is attached to an axle that allows the viewer to read or discern the wheel covers markings when the vehicle is in motion as well as stationary.

U.S. Pat. No. 3,158,946 discloses a spinning hub cap attached to a rotating vehicle wheel which contains an attractive, attention holding hub cap of the kind indicated, which is adapted to be spun relative to a vehicle wheel on which it is mounted, as the vehicle wheel rolls forwardly, and to continue to spin after the vehicle wheel has been brought to a stop.

SUMMARY OF THE INVENTION

The present invention is comprised of motorcycle wheel accessories that attaches to non-rotating axles of a motorcycle. Through the use of a bearing, an aerodynamically designed devise is attached to the stationary mounting cup and it rotates as a function of the surrounding air speed. The air driven rotating parts are attached to the mounting cup using screws. A mirror image of unit would be installed on the opposite side of the axle.

The accessories could have a finished look by anodizing, painting or chroming the external surface. The rotating device and cap end cone could be fabricated from metals, alloys or plastics. The mounting cup, bearing and lock in pin are fabricated using metal or alloys.

BRIEF DESCRIPTION OF THE DRAWINGS

FIG. 4 provides a cross sectional view of how the bearing is attached to the rotating device.

DETAILED DESCRIPTION OF THE DRAWINGS

Figure 1:
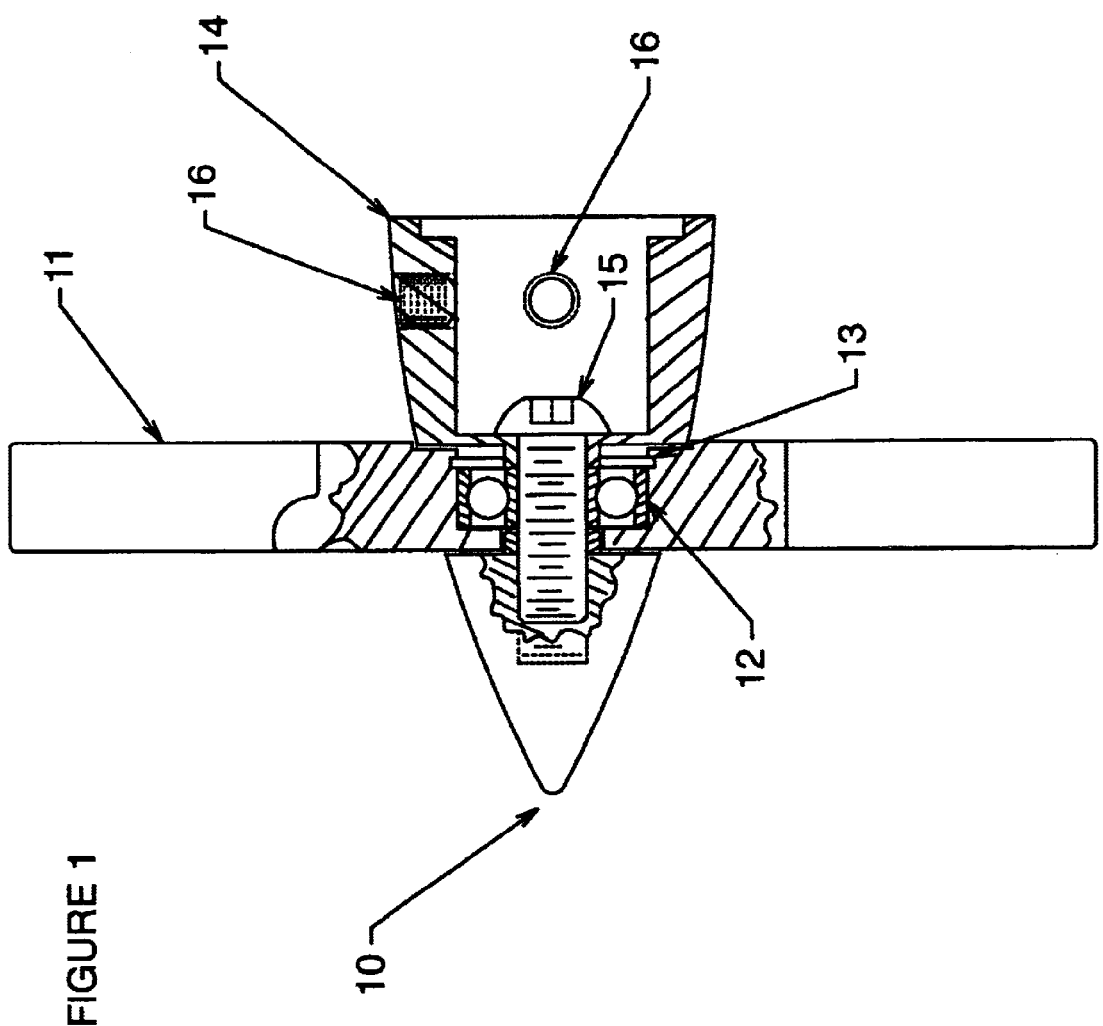
FIG. 1 is a cross section of a complete apparatus.

FIG. 1 is cross sections of a complete inventive apparatus for both sides of the motorcycle front or rear axles. The assembly is attached to the axles by the use of the mounting cup 14 and secured to the axle by sets-crews 16. Bearing 12 is inserted into the rotating device 11 and held in place by the locking clip 13. The rotating device 11 is held in place to the mounting cup 14 by means of a screw 15 that attaches it to the mounting cup 14 and to the cone end cap 10. The cone end cap 10 is held in place by the screw 15.

Figure 2:
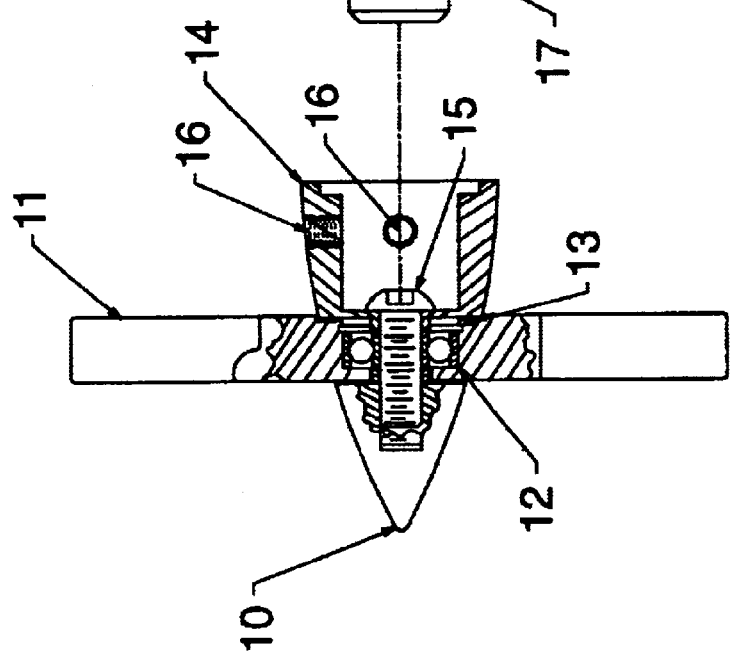
FIG. 2 is a cross section of the apparatus as it is assembled on the axle by setscrews.

FIG. 2 provides a cross section of the inventive apparatus shown in FIG. 1 as it is attached to the axles 17 and by setscrews 16.

Figure 3:
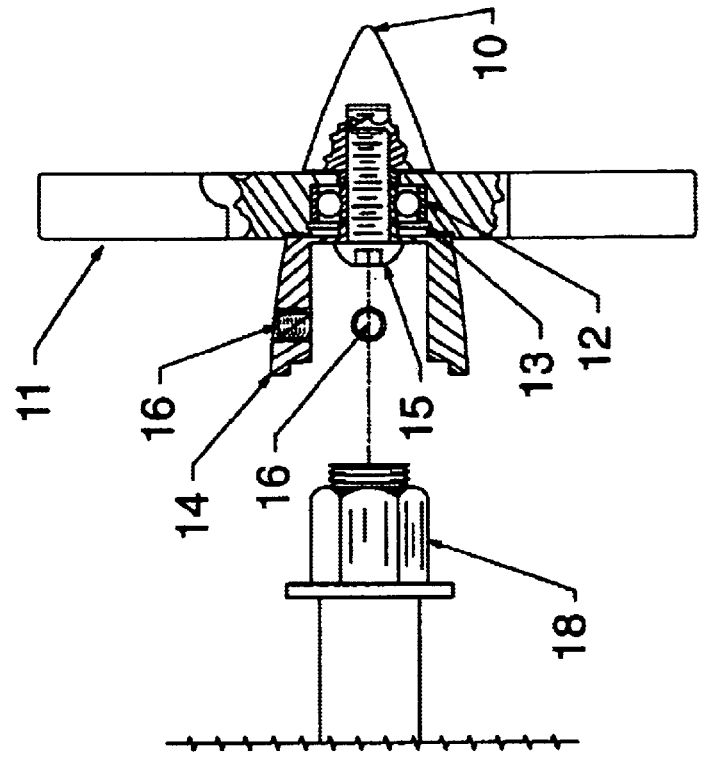
FIG. 3 is a cross section of the apparatus as it is assembled on the axle with the securing nut by setscrews.

FIG. 3 provides a cross section of the inventive apparatus shown in FIG. 1 as it is attached to the other side of the axle that has a securing nut 18 and it is secured to the nut 18 by setscrews 16.

FIG. 4 provides a cross section of how the bearing 12 is attached to the rotating device 11.

Bearing 12 is held in place by the lock in clip 13 that is inserted into the groove 11A machined into the rotating device 11.

Figure 5:
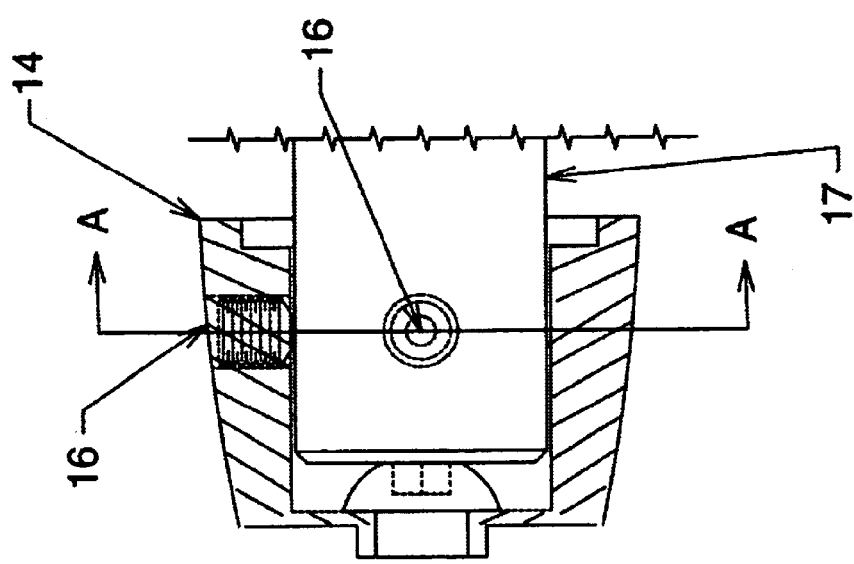
FIG. 5 provides a cross sectional view of how the mounting cup is secured to the axle.

FIG. 5 provides a cross section of bow the mounting cup 14 is assembled on to the axle 17 and held in place by setscrews 16.

Figure 6:
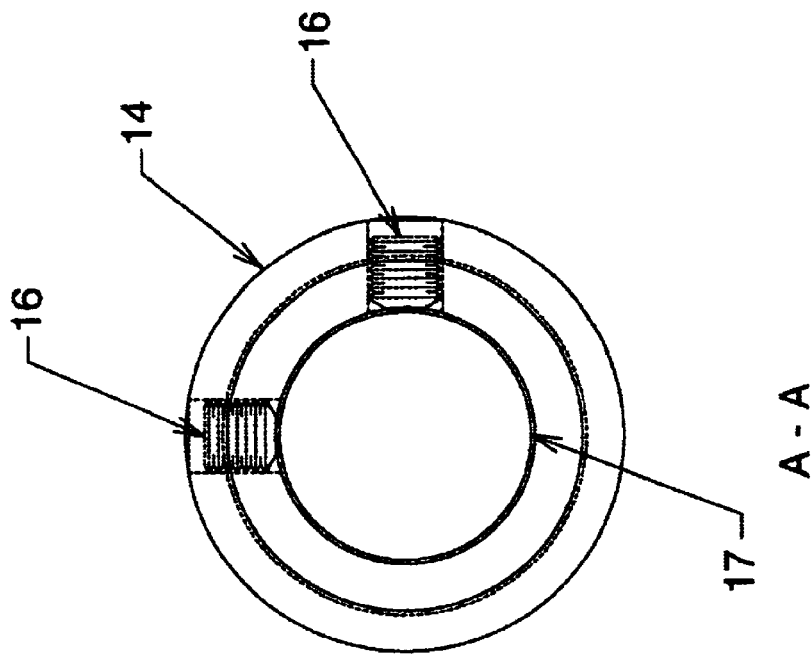
FIG. 6 is a cut-away of the mounting cup showing the setscrews.

FIG. 6 is a cut-away of FIG. 5 showing how the setscrews 16 hold in place the mounting cup 14 to the axle 17. The locations of the setscrews 16 are positioned at different angles on the mounting cup 14 so that they hold tight against the flats on the nut 18.

Figure 7:
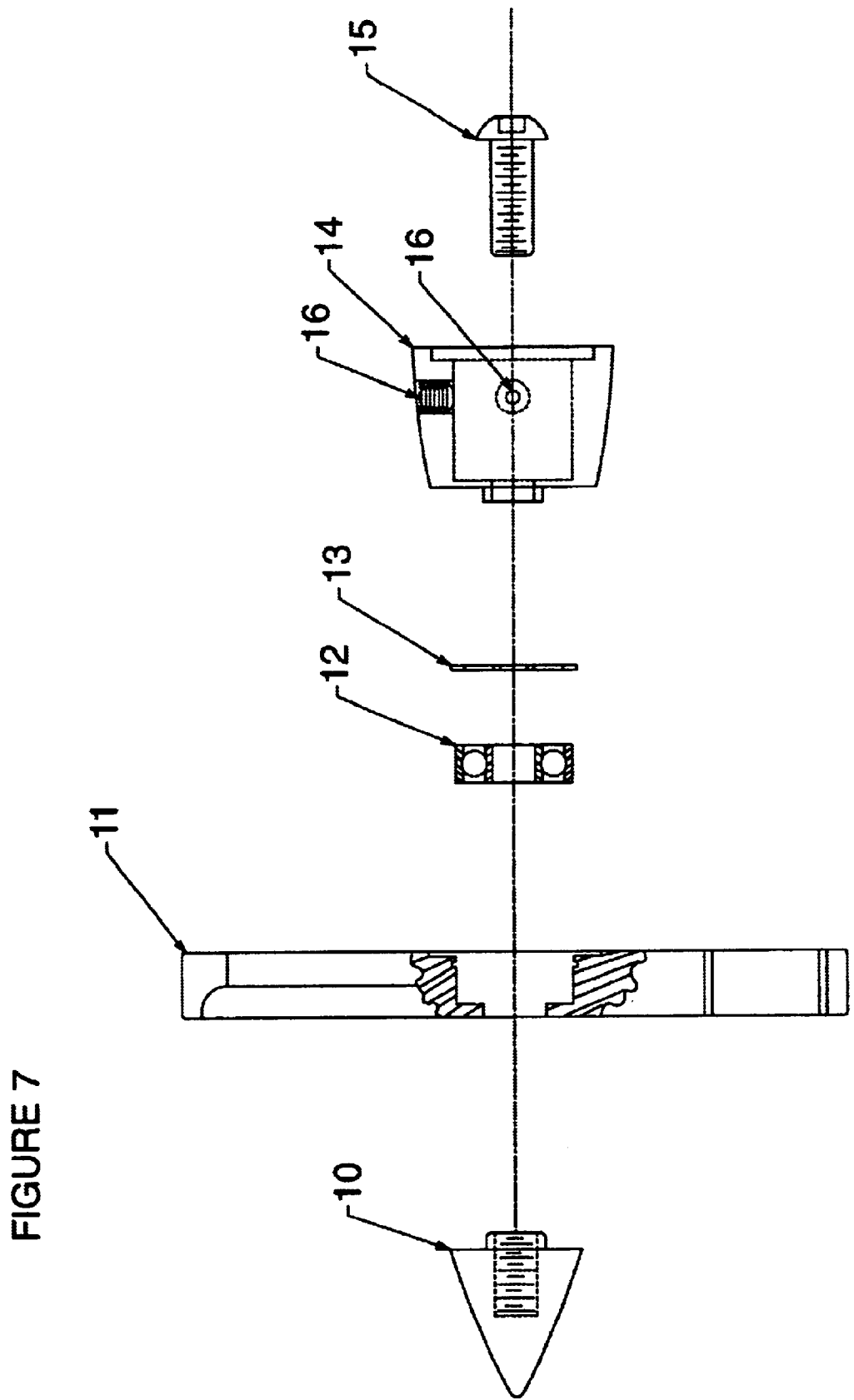
FIG. 7 provides an exploding view of the complete apparatus.

FIG. 7 provides an exploding cross section view of the inventive apparatus shown on FIG. 1.

Figure 8:
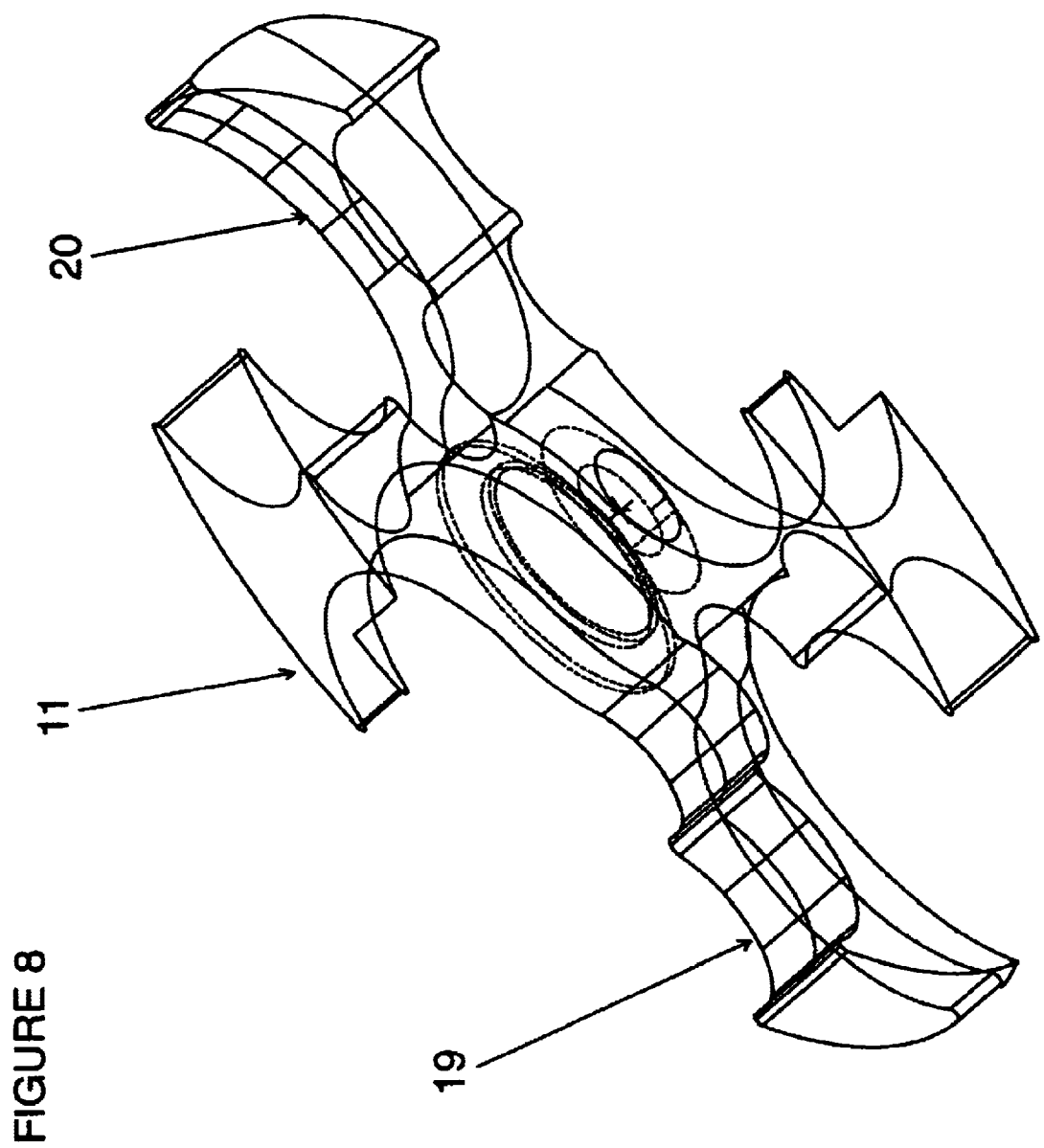
FIG. 8 is a skeletal three-dimensional view of the rotating device showing the two air driving surfaces.

FIG. 8 shows a three dimensional view of the air-driven rotating device 11 to illustrate the difference in the two surfaces that make the air-driven rotating device 11 rotate as a function of the air velocity striking these surfaces. The surface area 19 is larger than surface area 20.

Figure 9:
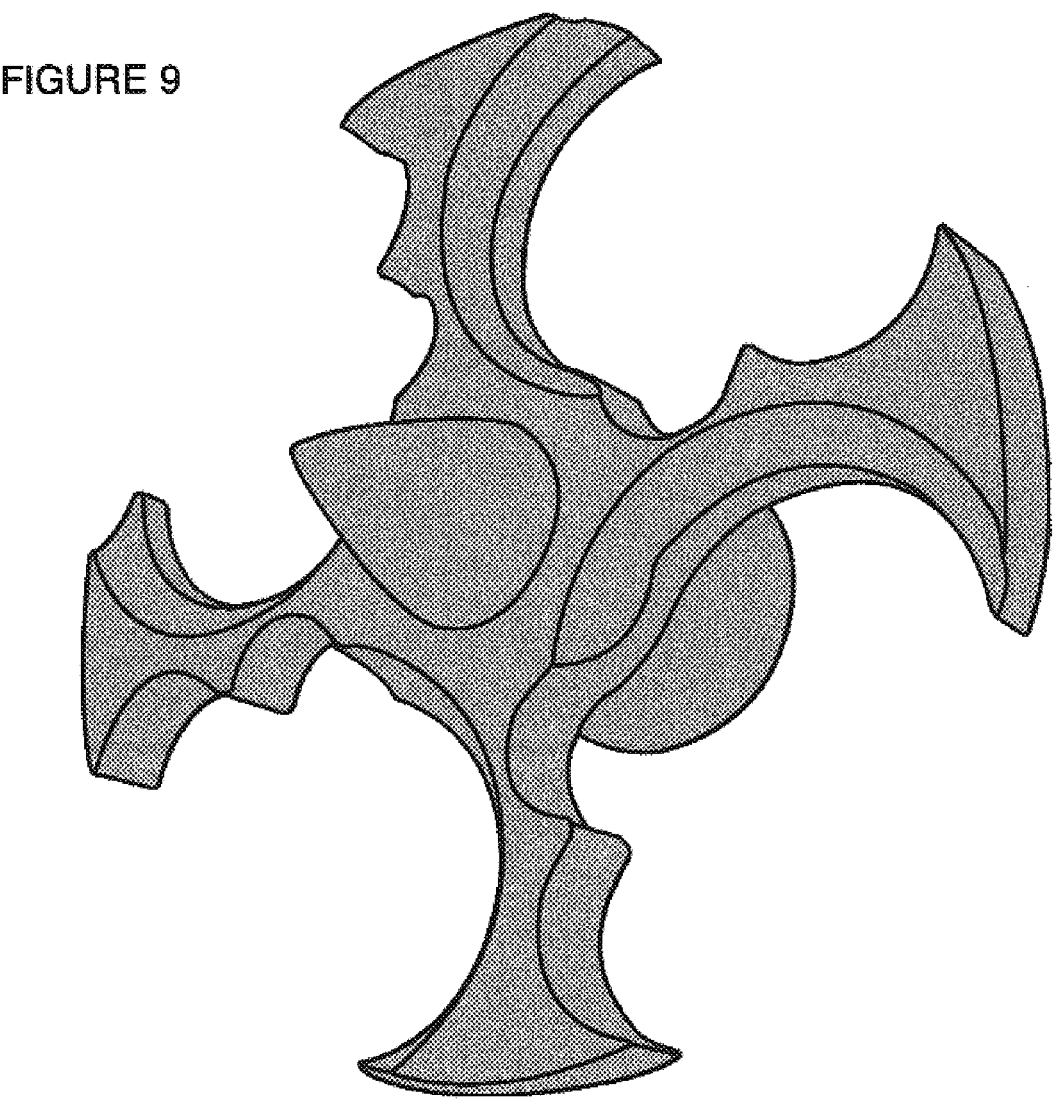
FIG. 9 is a photograph of the complete apparatus.

FIG. 9 is a photograph of the complete apparatus.

DESCRIPTION OF THE PREFERRED EMBODIMENTS

The embodiment shown in FIGS. 1–7 shows how the inventive apparatus is mounted and assembled onto the motorcycle axles. The mounting cups 14 are securely attached to the motorcycle axle 17 and 18 by the two setscrews 16.

FIG. 8 shows details of the air-driven rotating device 11. As the motorcycle gains speed, the air impinging on the flat surface 19 of the rotating devices 11 wing and exerts a force. That force is a function of the air velocity and the surface area exposed to such air velocity creating a rotating motion. Air velocity or speed is the only force causing the rotating device to rotate. On the opposite side of the above-mentioned flat surface 19, the projected surface 20 is exposed to the same air velocity. Since surface 20 is smaller than surface 19, this exerting a lesser force. This imbalance of the two opposing forces creates the rotation of the air-driven rotating device 11. As the difference in project areas 19 and 20 increases, the rotational speed would also increase at same air velocities. The air-driven rotating device 11 is attached to the mounting cup 14 by the use of a securing screw 15. This securing screw 15 holds together the cone end cap 10 and the air-driven rotating device 11 to the mounting cup 14. The bearing 12 is held in place by the lock in clip 13 onto the rotating device 11. The mounting cup 14 is secured to the axles by setscrews 16.

What is claimed is:

1. A spinner attachment for an axle comprising:
    a mounting cup having a plurality of openings extending through a sidewall and an end thereof;
    a rotating device having a plurality wing portion;
    a bearing assembly fitted to the rotating device;
    a mounting screw extending through the opening in the end of the mounting cup for connecting the mounting cup to the device, the bearing assembly allowing the rotating device to rotate about the mounting screw;
    and a plurality of set screws extending through the openings in the sidewall of the mounting cup to fasten the mounting cup to the axle, of a vehicle.

2. The spinner attachment as set forth in claim 1, further comprising:
    an end cap attached to the mounting screw to secure the rotating device to the mounting screw for rotation thereon.

3. The spinner attachment as set forth in claim 2, wherein:
    the end cap is cone-shaped.

4. The spinner attachment as set forth in claim 1, wherein:
    the rotating device and the cap end can be chrome-plated, anodized, or painted.

5. The spinner device as set forth in claim 1 wherein:
    the end cap is made of a material selected from the group comprising metals, alloys, or plastics.

* * * * *